July 16, 1957 C. P. LILJENGREN ET AL 2,799,326
RECLINING SEAT BACK CONSTRUCTION

Filed May 19, 1951 4 Sheets-Sheet 1

INVENTORS
CURTIS P. LILJENGREN
WARREN H. BUSH
BY
Albert H. Kirchner
ATTORNEY

July 16, 1957    C. P. LILJENGREN ET AL    2,799,326
RECLINING SEAT BACK CONSTRUCTION
Filed May 19, 1951            4 Sheets-Sheet 2
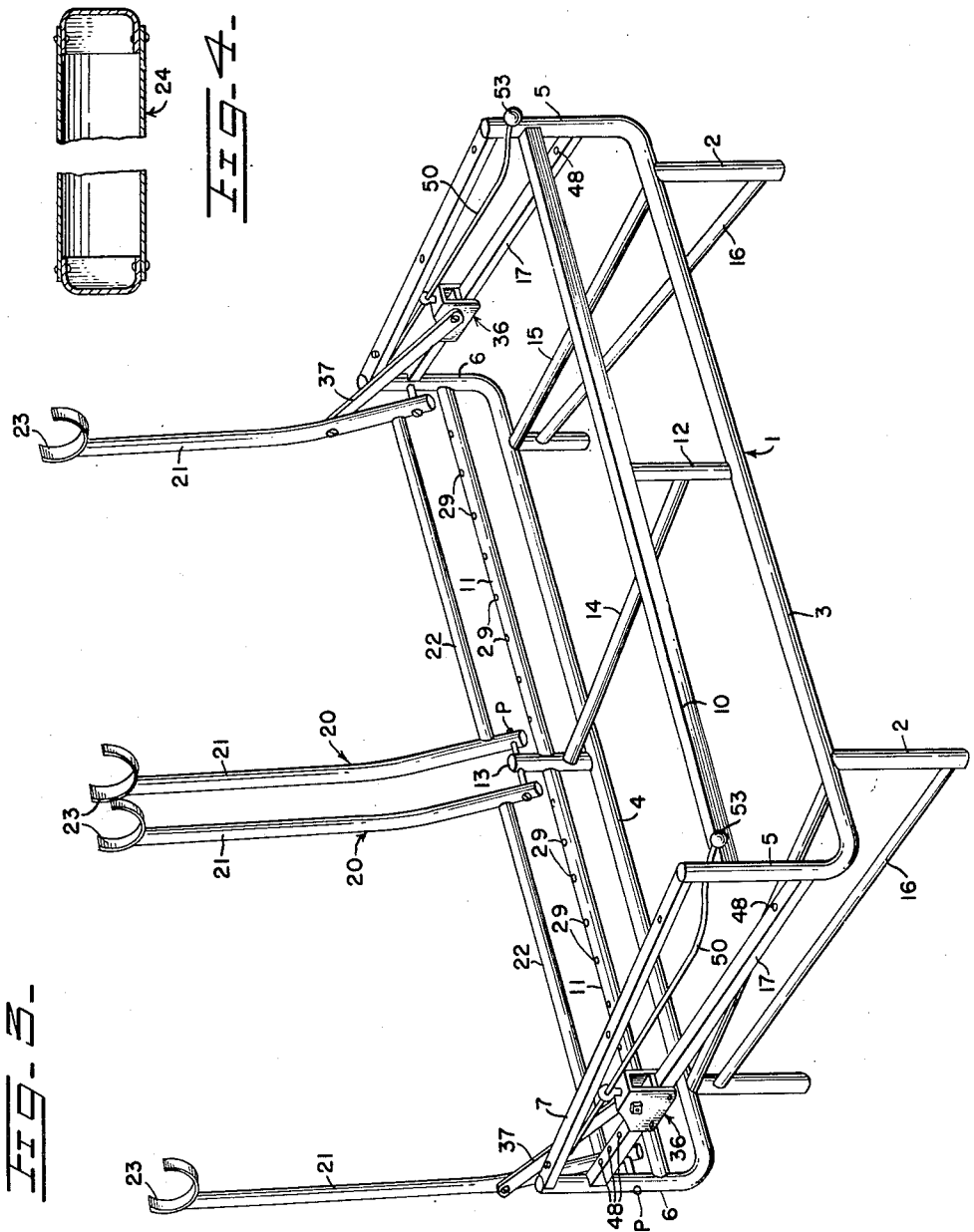
INVENTORS
CURTIS P. LILJENGREN
WARREN H. BUSH
BY
ATTORNEY

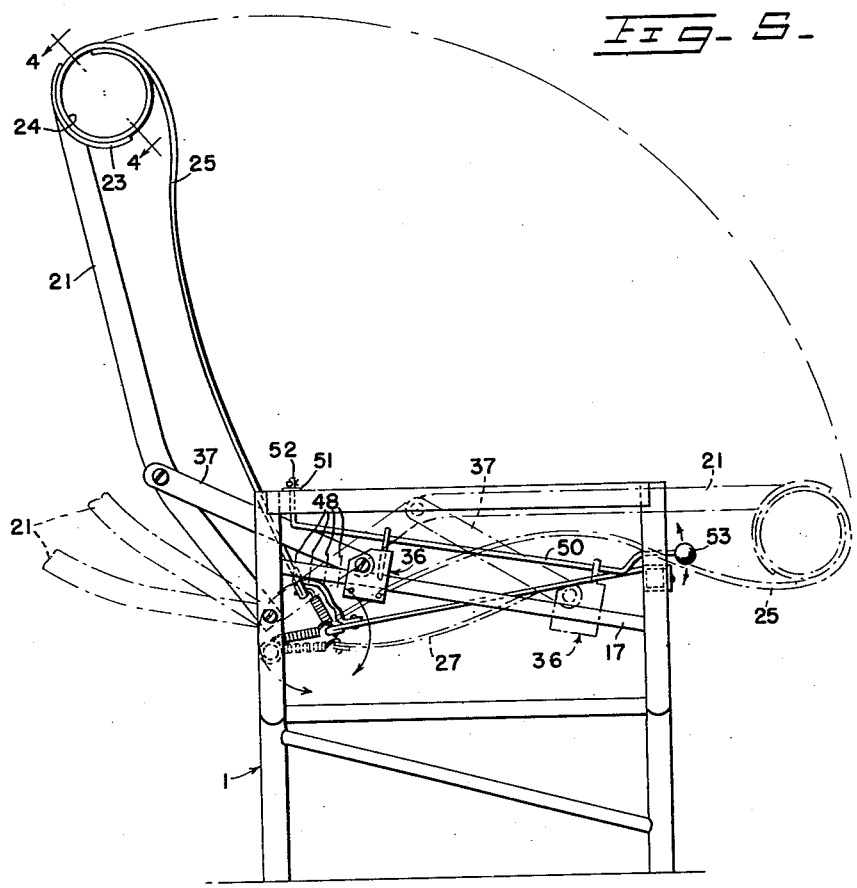
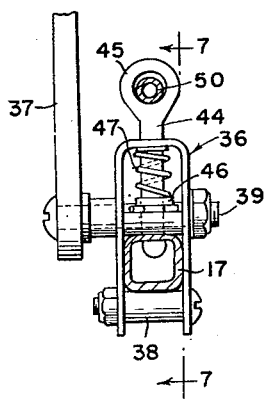

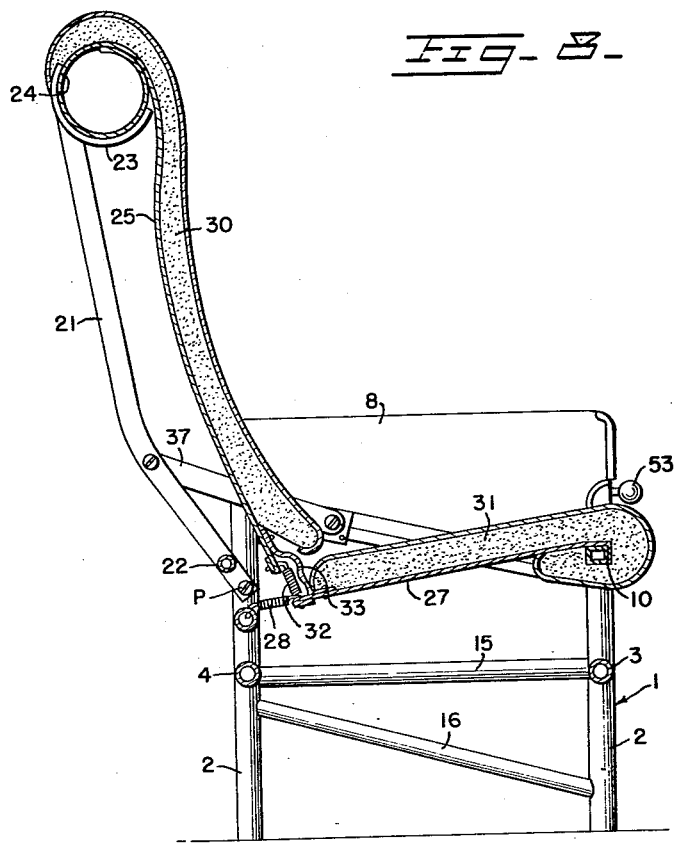
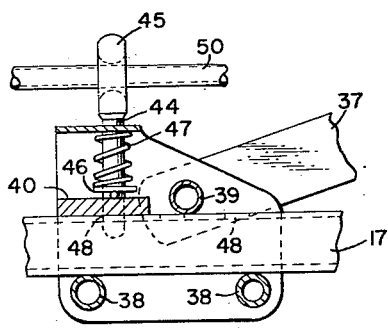

2,799,326
Patented July 16, 1957

United States Patent Office

2,799,326
RECLINING SEAT BACK CONSTRUCTION

Curtis P. Liljengren and Warren H. Bush, Miami, Fla., assignors to Flight Equipment and Engineering Corp., Miami, Fla., a corporation of Florida Application May 19, 1951, Serial No. 227,226

5 Claims. (Cl. 155—163)

The present invention relates to seat constructions, and more particularly to vehicle seats of the type especially suitable for use in the passenger cabins of aircraft.

More particularly the invention contemplates certain new and useful improvements in the mechanism and structure of seat constructions including backs that are adjustable to reclining and/or folded positions, i. e., which are pivotally associated with fixed structure, such as a supporting frame or base, and are movable relatively thereto to adjustable inclinations which may or may not include complete folding down on the seat bottoms.

General objects of the invention are concerned with providing durable mechanism and structure of the type indicated which will be simple in design, inexpensive to manufacture, light in weight, easy and foolproof in operation, and generally superior to the best prior art constructions.

More detailed objects are concerned with providing an improved locking or latching mechanism for fixing, under the control of the seat occupant, the back inclination and for permitting instantaneous adjustments of such inclination and fixing the back securely in adjusted positions.

In the accompanying drawings, which illustrate a certain preferred embodiment of the invention, Figure 1 is a perspective view of a double occupancy seat embodying the principles of the invention;

Fig. 3 is a perspective view of the general framing structure;

Fig. 4 is a section taken through the head roll of the seat back, on the line 4—4 of Fig. 5;

Fig. 5 is a side elevational view, generally diagrammatic in form, showing the seat back in several of its adjusted positions;

Fig. 6 is a detail cross sectional view taken through the locking bar or track member of the frame;

Fig. 7 is a cross sectional view taken on the line 7—7 of Fig. 6; and

Fig. 8 is a vertical cross sectional view taken on the line 8—8 of Fig. 1.

Figure 1:
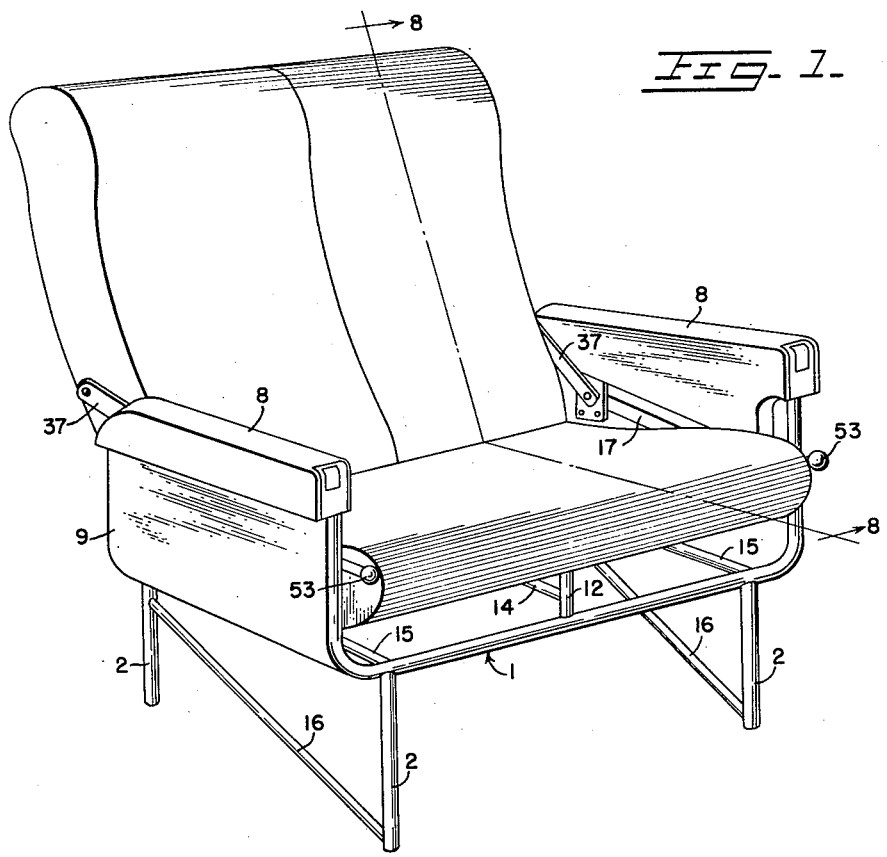
Figure 2:
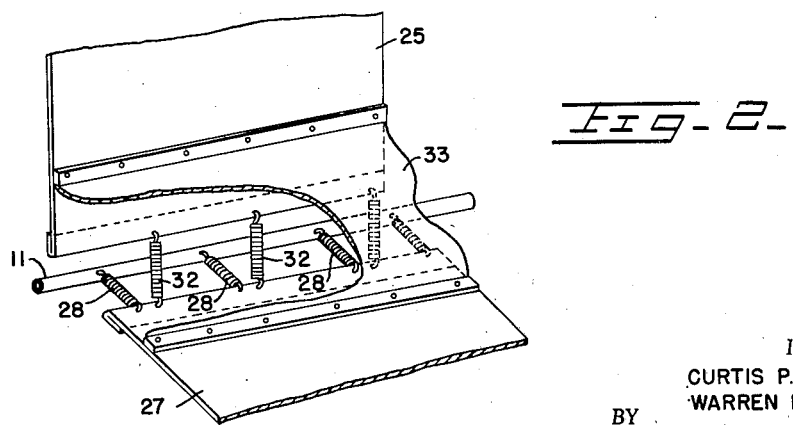
Fig. 2 is a detail perspective view of the lower portion of the seat back pan and the rear portion of the seat bottom pan, showing certain of the appurtenant connecting structure.

Generally speaking, the structure includes a supporting frame, which in use is fixed in position on a floor, such as the floor of an aircraft cabin or the like, and this supporting frame mounts a seat bottom and a seat back which are relatively adjustable to provide varying degrees of inclination of the back, and the present invention provides mechanism for fixing the back selectively at predetermined degrees of inclination.

In the drawings, the reference numeral 1 designates generally the fixed supporting frame structure, which may comprise a plurality of vertical legs 2 supporting a front cross member 3 and a rear cross member 4 both of which terminate at their ends in upturned posts 5, 5 at the front and 6,6 at the rear. The posts of each pair 5, 6 are connected at their tops by a lengthwise frame member 7 on which is mounted an armrest 8, and the pair of posts are covered by side trimming 9 to provide a finished appearances.

The supporting framework 1, which is preferably made principally of light tubular metal, is best made to include a front upper cross member 10 and a rear upper cross member 11, secured at their ends, respectively, to the posts 5 and 6, as best shown in Fig. 3. Additional framing elements may include a front center post 12, a rear center post 13, a center longitudinal brace 14, side longitudinal braces 15, and leg diagonals 16, all as shown in Fig. 3.

Serving incidentally as part of the supporting frame structure, but functioning additionally as part of the back adjusting means presently to be described, is the member 17. As best appears in Fig. 3, such a member is provided at one side of each individual seat element, so that in the double seat structure shown in that figure a member 17 is located at each side of the combination frame. Each of the members extends lengthwise of the frame and is secured at its front and rear ends to the posts 5 and 6 respectively, between which it lies at a slight rearward and upward inclination. The members are best made of tubular stock which is square in cross section, or which presents a flat upper surface, as shown in Fig. 6.

A back frame, generally designated 20, or a pair of such back frames in the case of a double occupancy seat, are formed principally of side members 21 connected at their lower ends by a cross member 22, and are hinged to the frame 1 as by pivot pins P connecting the lower ends of the side members 21 to the posts 6 and 13, all as best shown in Fig. 3. The upper ends of the back side members 21 may be specially formed, or be provided with brackets 23, for receiving and holding a back pan cross piece such as the rolled upper end margin 24 of the thin, flexible sheet of metal which in the illustrated embodiment of the invention constitutes the back pan 25.

Any suitable type of seat bottom is mounted on the supporting frame 1. Selected to illustrate this element is a thin flexilble sheet metal pan 27 which has its front margin turned over and secured to the front upper cross member 10 and has its rear edge tied by a number of laterally spaced tension springs 28 to the rear upper cross member 11. These springs may take the form of short coils having terminal hooks engaged in holes 29 formed in the member 11 and in similar holes in the rear margin of the pan 27, as shown in Fig. 8.

Any appropriate type of cushion surfacing may be applied to the pans 25 and 27, e. g., the layers of sponge rubber covered by fabric finishing shown at 30 and 31 respectively in Fig. 8.

In the bottom and back construction illustrated it is desirable to connect the pans 25 and 27 by resilient tension means, such as the springs 32, and to cover the springs by a sheet of fabric, such as strong canvas 33, to mask the springs 32 and 28.

As has been explained, the seat back is hinged about pivot pins P to the frame 1. This mounting permits the back to be swung through a range of inclination which, as shown by the broken lines in Fig. 5, may vary from full backward reclining position to a forwardly folded position in which the back lies down on and in contact with the seat bottom.

The invention provides means for fixing the back adjustably at selected degrees of inclination, and the mechanism for accomplishing this object will now be described.

A carriage element 36 is slidably mounted on the member 17, which thus serves as a track for it, and is connected with the back by a link 37. As shown, this link may be pin-connected at its ends to the element 36 and to the adjacent back side frame member 21. Specifically, the element 36 may comprise a generally inverted channel shaped member having a pair of lower sleeved pins 38 and an upper sleeved pin 39 connecting its two side flanges. A flat bridge piece 40 similarly connects the side flanges and cooperates with the pin 39 to ride along the top flat surface of the track member 17 while the lower pins 38 engage the bottom flat surface of the track member, thus providing a stable running connection and preventing cocking or jamming. One of the pins, such as the upper pin 39, may be extended to connect the link 37 to the element 36.

The top of the element 36, comprising the web of the channel which forms the element, and the bridge piece 40, are drilled with aligned openings which serve as bearings for a pin 44 which terminates at its top in an eye 45 and has fixed at its lower portion a washer or cross pin 46 acting as an abutment for a coil spring 47 which acts in tension to expand and urge the bottom end of the pin 44 down through the opening in the bridge piece and into any one of a series of openings 48 in the upper surface of the track member 17. It will be obvious that the element 36 can be slid along the track member 17 by lifting the pin 44 up out of any of the openings 48 in which it may be standing, and that the element 36 can then be fixed in some new position with the pin projected into a different opening 48. It is desirable to relate the dimensions of the parts, including particularly the solid length of the spring 47, in such a way that the pin 44 cannot be elevated enough to free its lower end from the opening in the bridge piece 40.

It will be evident that adjusting the element 36 along the track member 17 will act, through the link 37, to alter the inclination of the seat back. A suggested range of adjustment is shown by the full and broken lines in Fig. 5. Included in this figure is a showing, in broken lines, of the seat back folded down into contact with the seat bottom, in which position the element 36 has moved to its extreme forwardmost position on the track member 17 and the pin 44 has been projected into a single opening 48 occupying a position spaced considerably forward of the group of five, more or less, openings 48 which are set close together in the rear portion of the track member. The openings of this latter group fix the pin 44 for setting the back at a substantially upright position and at any of its reclining positions.

The pin 44 is withdrawn from the openings 48 by an operating rod 50 which extends through the eye 45 and has its rear end fulcrumed in an opening in the rear part of the upper side frame member 7, being held in place therein by a washer 51 caught under a cotter key 52. The number of washers 51 may be increased or reduced in assembling the structure to cooperate for tolerances in manufacture, and the washer, cotter key and projecting end of the rod are covered and concealed in the finished seat by the arm rests. The operating rod terminates forwardly in a knob 53, which projects from the front end of the arm rest and is readily accessible to an occupant of the seat for lifting and lowering. The operating rod can be kept captive and held against sidewise wobbling in any convenient way. For example, the inner panel of the armrest may be inwardly offset or joggled and elongated downwardly somewhat below the level of the outer panel of the arm rest to provide a narrow space within which the arm lies, as shown in Fig. 1.

It will be observed that the weight of a person occupying the seat acts through the springs 32 to pull the back forward, thus stressing the link 37 to push the element 36 forward. Consequently, when the occupant lifts the knob 53, the back tends to move to a more upright position. If a more reclined position is desired, it is necessary for the occupant merely to lean back until the desired angle of inclination is reached and then release the knob to seat the pin 44 in the next adjacent opening 48.

The invention has been described and illustrated in terms of the preferred embodiment merely for the purpose of exemplification of the inventive principles. It is to be understood that those principles may be otherwise embodied and need not all be used in the particular combination shown, and that all modifications thereof within the spirit of the appended claims are to be deemed within the scope and purview thereof.

We claim:

1. A seat construction comprising a supporting frame, a seat bottom mounted thereon, a seat back hinged at its lower portion to said frame, and means connecting the back to the frame for fixing the back at angularly adjusted positions relative to the bottom comprising a track member carried by the frame, extending lengthwise thereof and provided with a series of openings, a carriage element slidable along the track member and carrying a pin engageable in said openings, a rigid link having one end pivoted to the seat back above the hinge thereof and having its other end pivoted to said carriage element, and actuating means engaged with the pin for fixing the carriage element at said adjusted positions, said actuating means comprising a lever hinged at one end to the rear portion of the frame and having its other end projecting forwardly for actuation by an occupant of the seat.

2. A seat construction comprising a supporting frame, a seat bottom mounted thereon, a seat back hinged at its lower portion to said frame, and means connecting the back to the frame for fixing the back at angularly adjusted positions relative to the bottom comprising a track member carried by the frame and extending lengthwise thereof and provided with a series of openings, a carriage element slidable along the track member and provided with a pin having a lower portion engageable in said openings and terminating at its upper end in an eye, a rigid link having one end pivoted to the seat back above the hinge thereof and having its other end pivoted to said carriage element, and actuating means for fixing the carriage element at said adjusted positions, said actuating means comprising a lever extending through the eye of the carriage element pin with its rear end pivoted to the rear portion of the frame and its other end projecting forwardly for actuation by an occupant of the seat.

3. The combination claimed in claim 1, in which the openings in the track member comprise openings adjacent its rear and front ends, whereby the seat back may be fixed at rearwardly inclined positions and in a position fully folded down into contact with the seat bottom.

4. The combination claimed in claim 1, including an arm rest connected to a side of the supporting frame and an operating knob formed on the forward end of the actuating means positioned beyond the front end of the arm rest.

5. The combination claimed in claim 1, in which the seat bottom is mounted on the supporting frame with freedom of the rear edge of the seat bottom for limited up and down movement and including a back pan connected to the front of the seat back and means connecting the bottom edge of the back pan to the rear edge of the seat bottom, whereby the weight of an occupant will tend to cause the upper portion of the seat back to swing forward about its hinge when the carriage element pin is disengaged from the openings in the track member.

References Cited in the file of this patent

UNITED STATES PATENTS

| 478,247 | Valentine | July 5, 1892 |
| 868,052 | Wilmot | Oct. 15, 1907 |
| 1,301,835 | Glenister | Apr. 29, 1919 |
| 1,955,687 | Scott | Apr. 17, 1934 |
| 2,090,311 | Saltman | Aug. 17, 1937 |
| 2,091,063 | Ball | Aug. 24, 1937 |
| 2,383,173 | Watter | Aug. 21, 1945 |
| 2,605,813 | Seitz | Aug. 5, 1952 |

FOREIGN PATENTS

| 110,887 | Australia | July 4, 1940 |
| 611,651 | Great Britain | Nov. 2, 1948 |
| 775,067 | France | Oct. 1, 1934 |